(12) United States Patent
Lee et al.

(10) Patent No.: US 11,358,856 B2
(45) Date of Patent: Jun. 14, 2022

(54) OPENING DEVICE FOR UREA WATER INLET OF VEHICLE

(71) Applicants: Hyundai Motor Company, Seoul (KR); Kia Motors Corporation, Seoul (KR)

(72) Inventors: Tae Yoon Lee, Seoul (KR); June Young Park, Hwaseong-si (KR); Jun Sik Lim, Bucheon-si (KR); Sung Won Lee, Hwaseong-si (KR); Seung Hoon Choi, Seoul (KR)

(73) Assignees: Hyundai Motor Company, Seoul (KR); Kia Motors Gorporation, Seoul (KR)

( * ) Notice: Subject to any disclaimer, the term of this patent is extended or adjusted under 35 U.S.C. 154(b) by 193 days.

(21) Appl. No.: 16/696,775

(22) Filed: Nov. 26, 2019

(65) Prior Publication Data

US 2020/0369506 A1 Nov. 26, 2020

(30) Foreign Application Priority Data

May 22, 2019 (KR) .......................... 10-2019-0059961

(51) Int. Cl.
 *B67D 7/02* (2010.01)
 *B60K 13/04* (2006.01)
 (Continued)

(52) U.S. Cl.
 CPC ............ *B67D 7/0294* (2013.01); *B60K 13/04* (2013.01); *B67D 7/36* (2013.01); *F01N 3/2066* (2013.01);
 (Continued)

(58) Field of Classification Search
 CPC combination set(s) only.
 See application file for complete search history.

(56) References Cited

U.S. PATENT DOCUMENTS

| 9,835,516 B2 * | 12/2017 | Thakkar | ................ B60K 15/04 |
| 2010/0218849 A1 * | 9/2010 | Hagano | ................ B60K 15/04 |
| | | | 141/350 |

(Continued)

FOREIGN PATENT DOCUMENTS

| JP | 2005-75308 A | 3/2005 |
| JP | 3921981 B2 | 3/2007 |

(Continued)

*Primary Examiner* — Binh Q Tran
(74) *Attorney, Agent, or Firm* — Morgan, Lewis & Bockius LLP

(57) ABSTRACT

An opening device for a urea water inlet may include a first body configured to be provided on an external side of an inlet of a urea filler neck; a second body disposed at an upper end portion of the first body with a ventilation gap between the first body and the second body, and provided with an internal space to be disposed above the inlet; a cover disposed at an upper end portion of the second body, and configured to receive a force to open the internal space of the second body; an opener provided in the second body, and configured to hold the cover at the upper portion of the second body when the cover is configured to close the internal space, and to release holding of the cover when being pressed toward an interior of the second body; and a membrane disposed between the first body and the second body to pass only air therethrough while covering the ventilation gap.

11 Claims, 10 Drawing Sheets

(51) Int. Cl.
*B67D 7/36* (2010.01)
*F01N 3/20* (2006.01)
(52) U.S. Cl.
CPC .. *F01N 2610/02* (2013.01); *F01N 2610/1413* (2013.01)

(56) References Cited

U.S. PATENT DOCUMENTS

| | | | | |
|---|---|---|---|---|
| 2012/0248114 | A1* | 10/2012 | Langemann | F01N 3/24 220/288 |
| 2015/0321836 | A1* | 11/2015 | Speas | F16L 37/40 141/1 |
| 2016/0221434 | A1* | 8/2016 | Georis | B60K 15/0406 |
| 2016/0290520 | A1* | 10/2016 | Memmer | F01N 3/2066 |
| 2017/0066643 | A1* | 3/2017 | Roys | B60K 15/00 |
| 2017/0184000 | A1* | 6/2017 | Kou | B67D 7/36 |

FOREIGN PATENT DOCUMENTS

| | | |
|---|---|---|
| JP | 2014-34224 A | 2/2014 |
| KR | 95-17683 U | 7/1995 |
| KR | 10-2017-0143099 A | 12/2017 |
| WO | WO 00/29113 A1 | 5/2000 |

* cited by examiner

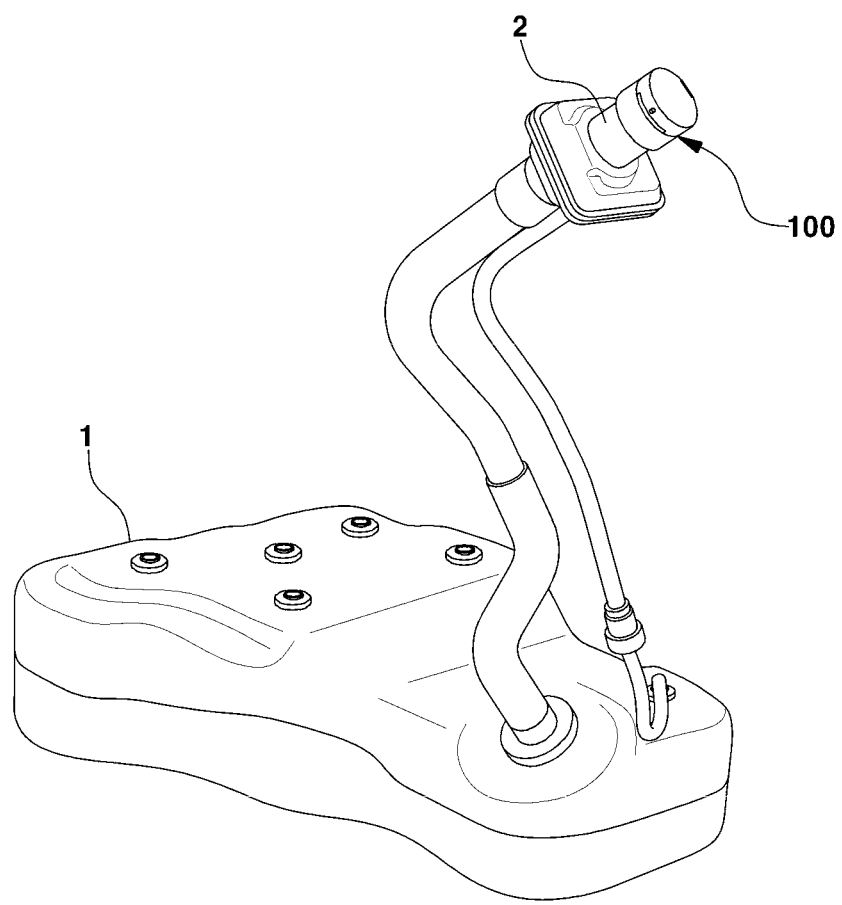

OPENING DEVICE FOR UREA WATER INLET OF VEHICLE

CROSS REFERENCE TO RELATED APPLICATION

The present application claims priority to Korean Patent Application No. 10-2019-0059961, filed May 22, 2019, the entire contents of which is incorporated herein for all purposes by this reference.

BACKGROUND OF THE INVENTION

Field of the Invention

The present invention relates to generally to an opening device for a urea water inlet of a vehicle. More particularly, the present invention relates to an opening device for a urea water inlet of a vehicle, in which it is possible to easily open the inlet without removing a urea cap mounted to the inlet of a urea filler neck from the inlet.

Description of Related Art

Generally, a diesel engine vehicle is applied with a urea water system to purify exhaust gas. The urea water system supplies urea water to a catalytic converter of the engine exhaust system, and the urea water supplied to the catalytic converter reacts with nitrogen oxides in the exhaust gas to reduce the same to nitrogen and water.

The urea water system includes a urea tank storing urea water, a urea filler neck connected to the urea tank to allow the urea water to flow to the urea tank, and a urea cap opening and closing an inlet of the urea filler neck.

A conventional urea cap is applied with an air permeability membrane to eliminate a positive pressure and a negative pressure that are generated in the urea tank when the urea water is discharged from the urea tank or recovered to the urea tank. The present urea cap is configured as a thread type which is mounted to the inlet of the urea filler neck by being threaded therewith, and the membrane closes the inlet of the urea filler neck at normal times (when not injecting urea water). Therefore, if urea water is to be injected into the urea tank, it is required to rotate the urea cap and remove the same from the inlet of the urea filler neck.

The above described urea cap is problematic in that it takes a long time to open or close the inlet of the urea filler neck, which causes inconvenience to a user. Furthermore, when a urea water injection gun is pulled out from the inlet of the urea filler neck after injecting the urea water, the urea water may be applied to a threaded portion of the urea filler neck. The urea water is highly corrosive and is solidified when exposed to the atmosphere. Therefore, if the urea water is applied to the threaded portion of the urea filler neck when the urea water is injected into the urea tank, the threaded portion is corroded or the urea water is solidified on the threaded portion, and as a result, it is difficult to re-assemble the urea cap to the inlet.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an opening device for a urea water inlet of a vehicle, in which it is possible to easily open the inlet in the state where a urea cap is mounted to the inlet of a urea filler neck.

In various aspects of the present invention, there is provided an opening device for a urea water inlet of a vehicle, the opening device including: a first body configured to be provided on an external side of an inlet of a urea filler neck; a second body mounted at an upper end portion of the first body with a ventilation gap between the first body and the second body, and provided with an internal space mounted at a position above the inlet; a cover mounted at an upper end portion of the second body, and configured to receive a force to open the internal space of the second body; an opener provided in the second body, and configured to hold the cover at the upper portion of the second body when the cover is configured to close the internal space, and to release holding of the cover when being pressed toward an interior of the second body; and a membrane mounted between the first body and the second body to pass only air therethrough while covering the ventilation gap.

The opening device for a urea water inlet may have the following characteristics.

The opener may include a button portion, and a locking portion protruding from an external surface of the button portion toward a lower surface of the cover. The second body may be provided with a sliding hole through which the button portion is slidably mounted, the sliding hole may be provided with an elastic member elastically supporting a first end portion of the button portion, and a second end portion of the button portion may protrude outside the sliding hole by the elastic member.

The cover may be provided at the lower surface thereof with a hooking portion protruding downwardly from the lower surface of the cover. The hooking portion may be engaged with the locking portion when the internal space of the second body is closed by operation of the cover. Furthermore, when the button portion is moved to slide in a direction of compressing the elastic member, the hooking portion engaged with the locking portion may be released and separated from the locking portion.

The membrane may be configured to have a predetermined width in an arrangement direction of the first body and the second body, and may be disposed in a circumferential direction of the first body. An upper portion of the membrane may be supported by being inserted into a lower hole of the second body, and a lower portion of the membrane may be supported by being inserted into an upper hole of the first body.

An elastic sheet may be disposed at the upper end portion of the second body, and an upper surface of the elastic sheet may be brought into close contact with a lower surface of the cover when the internal space of the second body is closed by operation of the cover. A lower end portion of the second body may be provided with a bonding portion fixed to the upper end portion of the first body, and the bonding portion may protrude from the lower end portion of the second body by a height corresponding to the ventilation gap.

The upper end portion of the second body may be provided with a torsion spring to elastically bias the cover with a force for opening the internal space of the second body. The torsion spring may generate the force for opening the internal space by being compressed when the internal space is closed by operation of the cover.

According to the opening device for a urea water inlet of a vehicle of the present invention, without removing a cap body mounted to an inlet of a urea filler neck from the inlet, by simply pressing an opener in a one-touch (push-open)

manner, an upper space of the inlet is open as a cover is turned. Thus, the opening device for a urea water inlet of the present invention may increase convenience of a user injecting urea water into the urea tank via the inlet. In other words, the opening device for a urea water inlet is advantageous in that it is possible to inject urea water into the inlet by use of an injection gun in the state where the cap body is fastened to the inlet.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view showing an opening device for a urea water inlet fastened to an inlet of a urea filler neck.

Figure 2A:
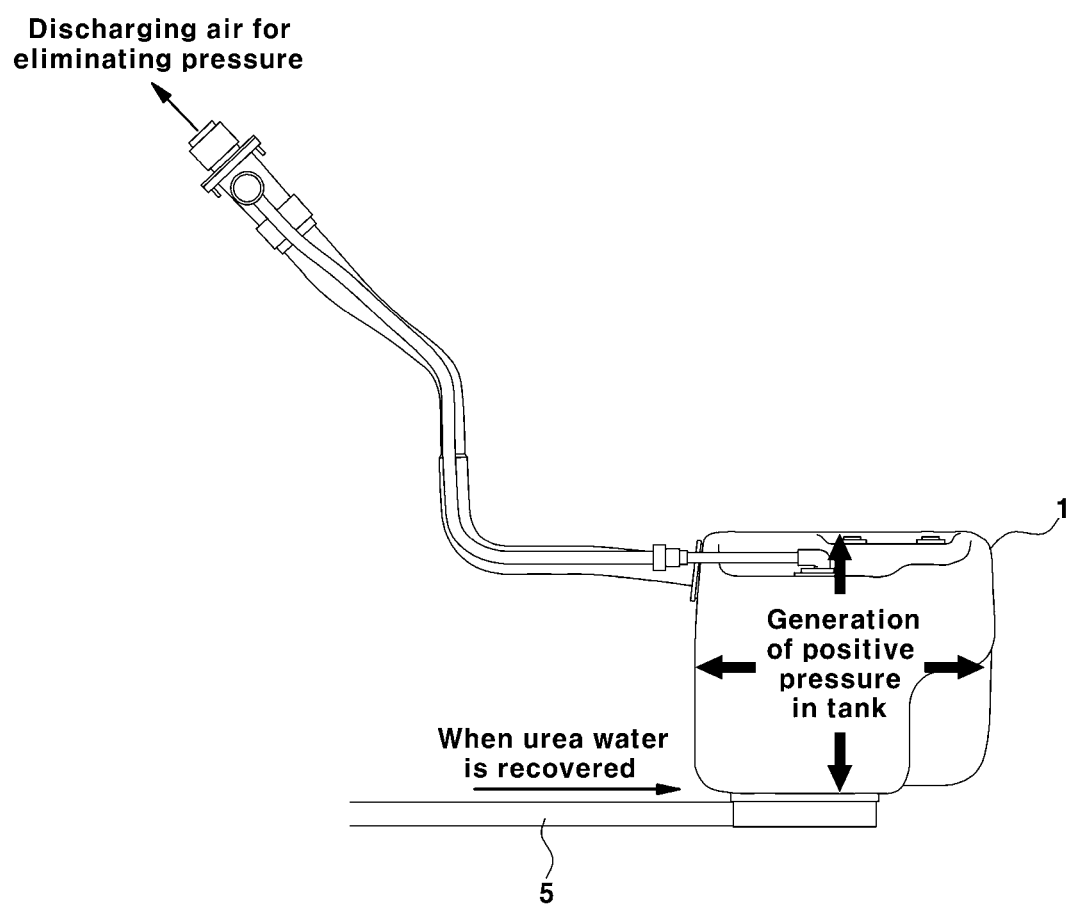
FIG. 2A and FIG. 2B are views showing states where a positive pressure and a negative pressure are generated in a urea tank.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, an exemplary embodiment of the present invention will be described in detail with reference to the accompanying drawings.

Figure 2B:
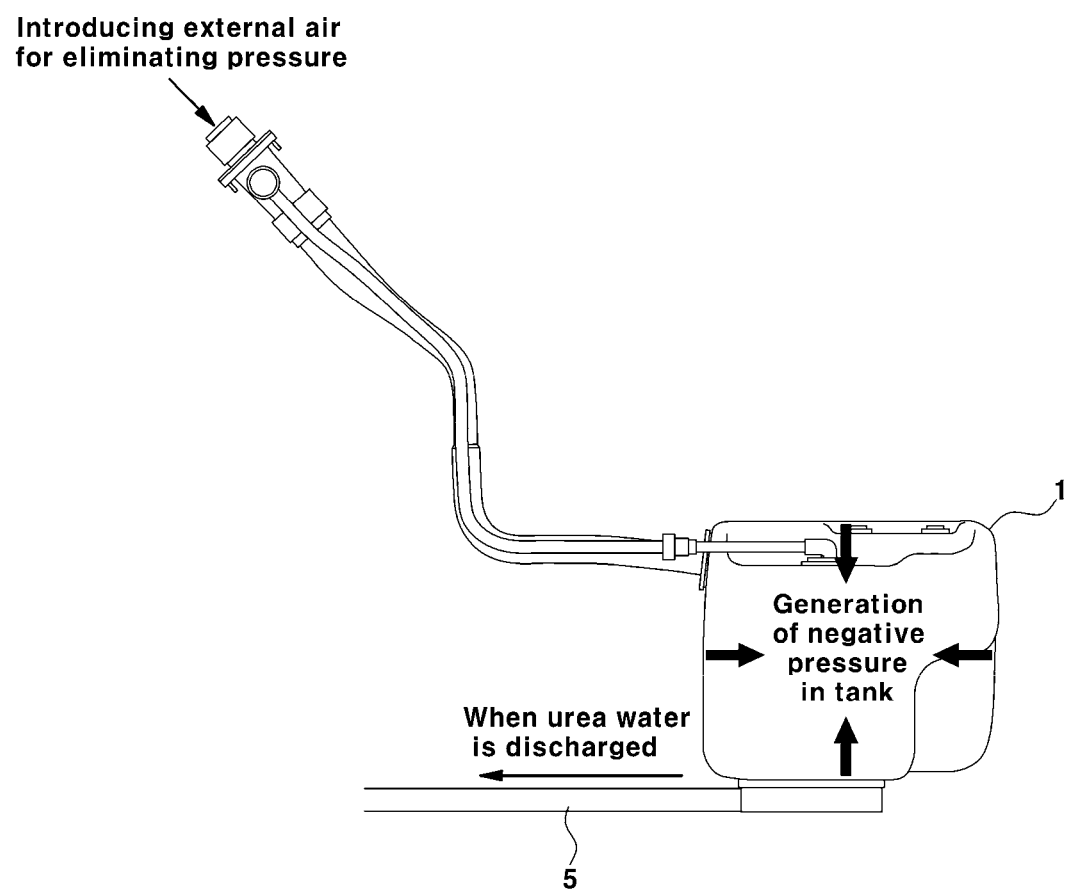

As shown in FIG. 1, a urea tank 1 which is mounted to a vehicle for storing urea water is connected to a urea filler neck 2 as a urea supply line, and is provided with a urea cap unit 100 for sealing and venting an inlet of the urea filler neck 2 (that is, a urea water inlet) (see reference numeral 3 in FIG. 7), and thus, urea water may be supplied to an engine exhaust system through a urea water tube (see reference numeral 5 in FIG. 2B).

The urea tank 1 is configured such that when the urea water is supplied to the engine exhaust system by a pump, a negative pressure is generated in the urea tank 1, and when the urea water is recovered from the engine exhaust system, a positive pressure is generated in the urea tank 1 (see FIG. 2A and FIG. 2B). To eliminate the negative pressure and the positive pressure in the urea tank 1, air in the urea tank 1 is discharged through the urea cap unit 100 or external air is introduced into the urea tank 1 through the urea cap unit 100.

Figure 3:
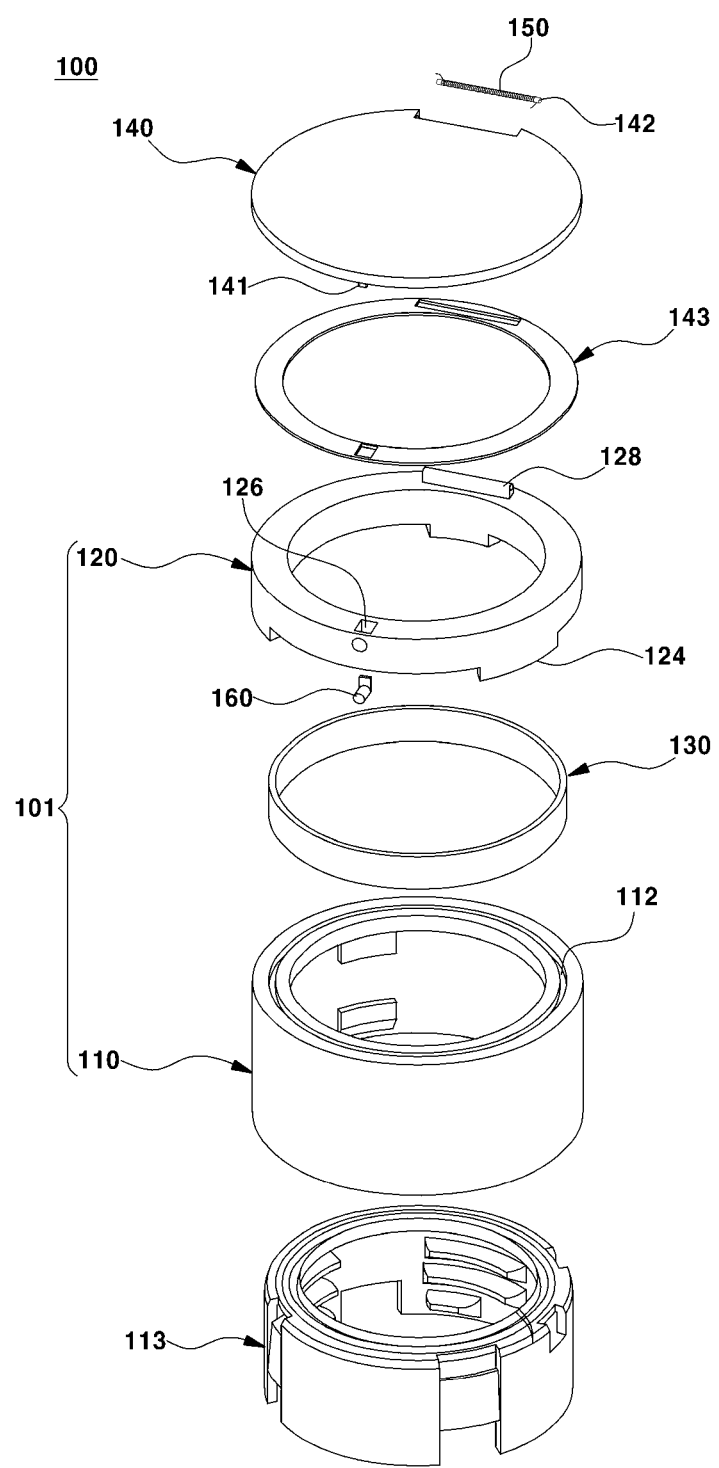
FIG. 3 is an exploded perspective view showing an opening device for a urea water inlet according to an exemplary embodiment of the present invention.
Figure 4:
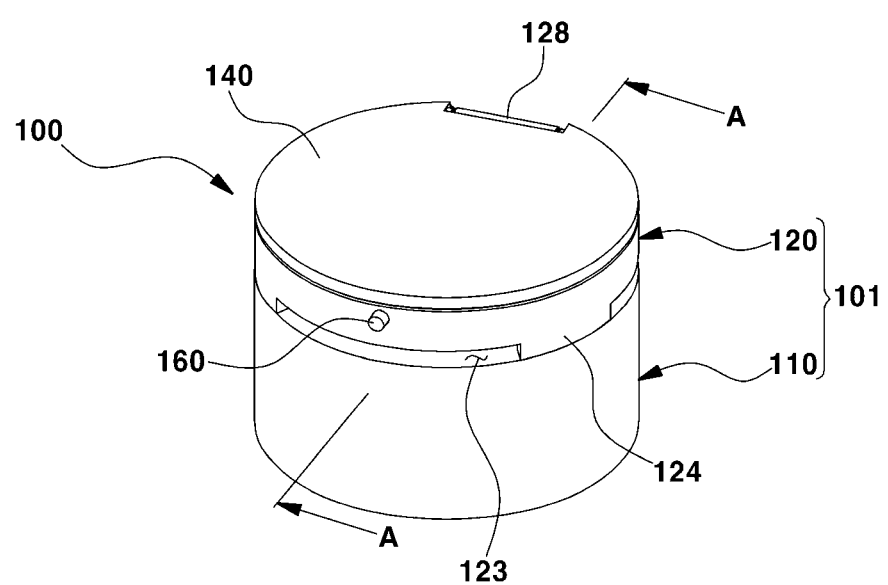
FIG. 4 is an assembled perspective view showing the opening device for a urea water inlet according to an exemplary embodiment of the present invention.
Figure 5:
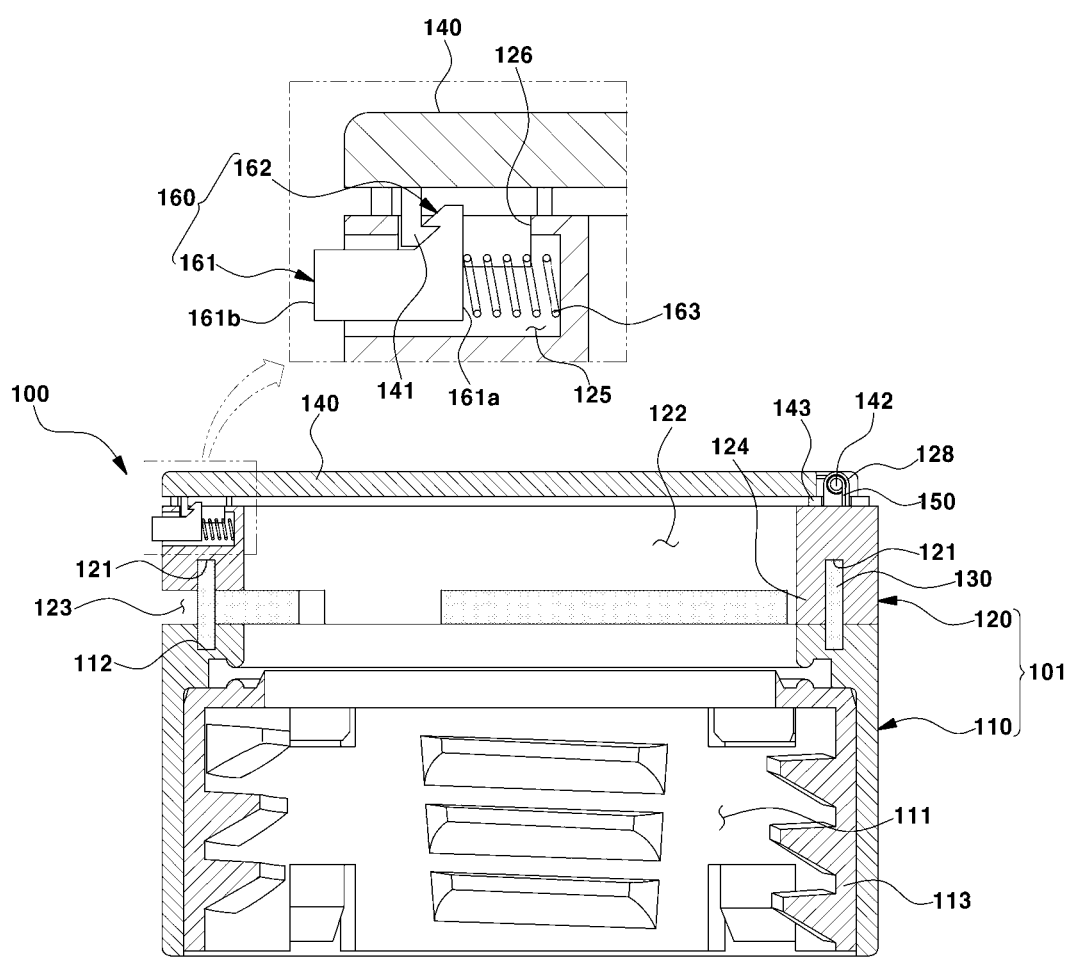
FIG. 5 is a sectional view taken along line A-A of FIG. 4.
Figure 6:
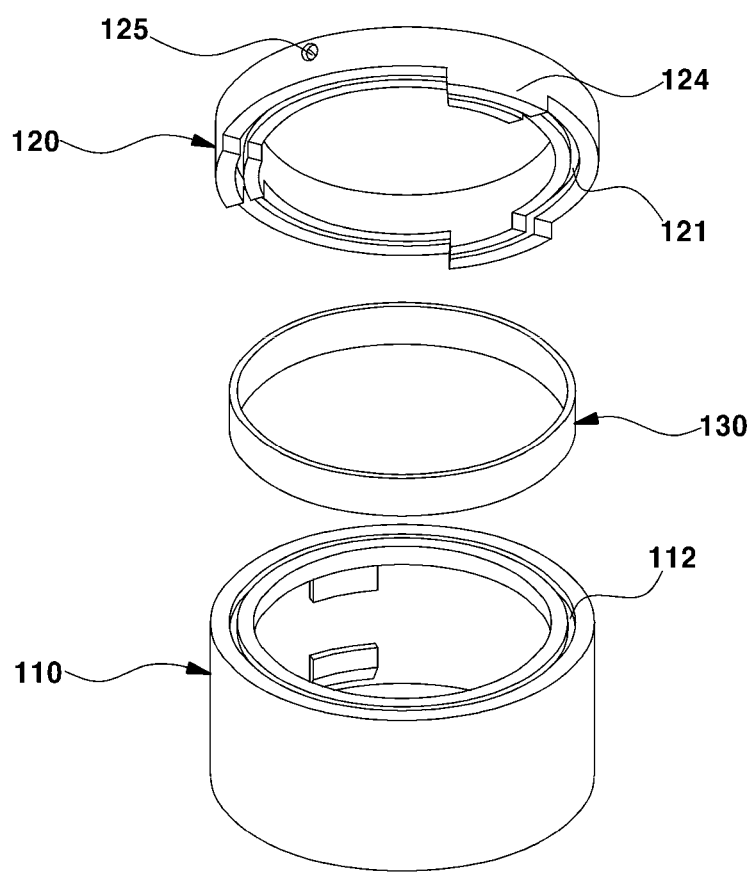
FIG. 6 is an exploded view partially showing a configuration of the opening device for a urea water inlet according to an exemplary embodiment of the present invention.
Figure 7:
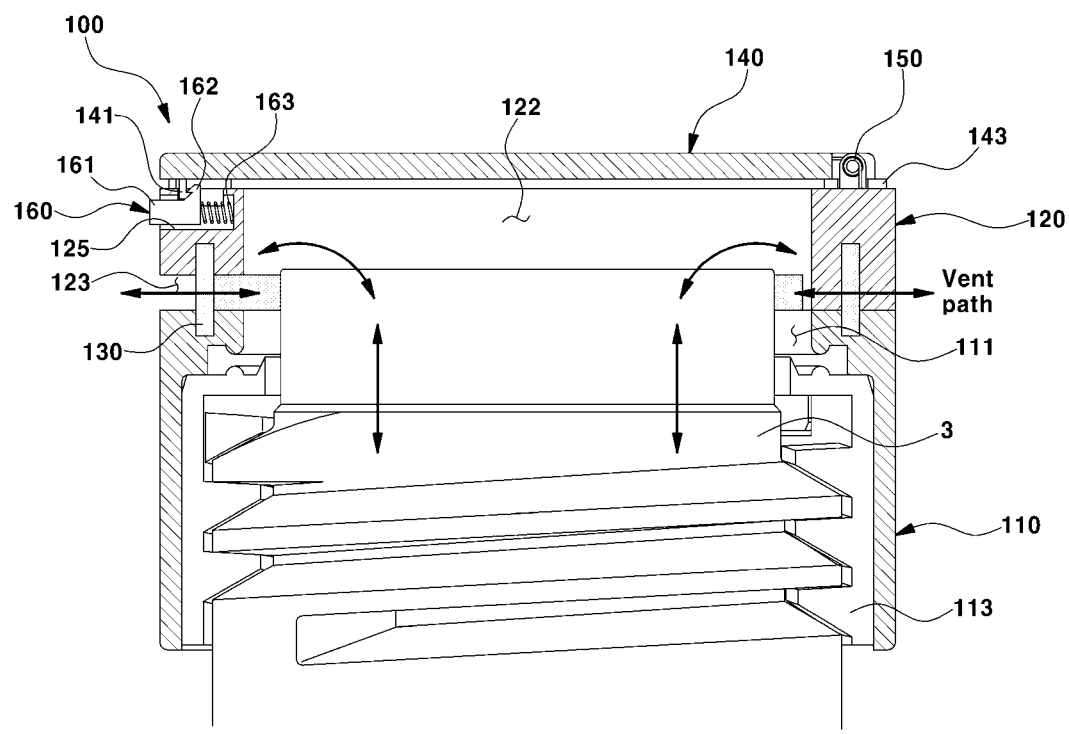
FIG. 7 is a view showing a vent path of the opening device for a urea water inlet according to an exemplary embodiment of the present invention.
Figure 8:
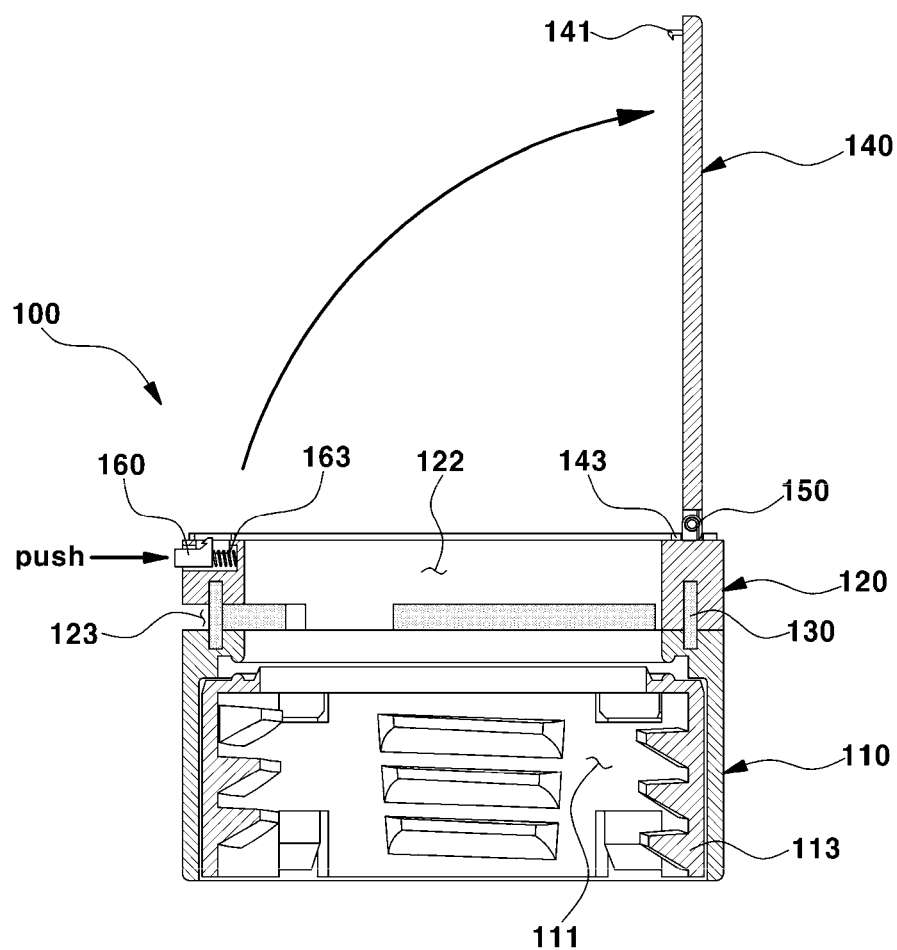
FIG. 8 is a view showing an open state of a cover according to an exemplary embodiment of the present invention.

To achieve this, the urea cap unit 100 is applied with a membrane 130 configured for filtering foreign substances while venting the interior of the urea tank 1 to the outside (see FIGS. 3 and 7). In other words, the urea cap unit 100 has a structure to ensure air permeability through the membrane 130 while sealing the urea water inlet 3.

The urea cap unit 100, which is a mechanism for opening and closing the urea water inlet 3, is configured to open or close the inlet 3 of the urea filler neck 2 for injecting urea water. To be specific, the urea cap unit 100 is configured to allow a user to easily open the upper space of the inlet 3. The sealed upper space of the inlet 3 is configured to be always permeable to the outside by the membrane 130. The upper space of the inlet 3 may be an internal space of a second body 120.

As shown in FIGS. 3 to 8, the urea cap unit 100 may include: a cap body 101 provided on an external side of the inlet 3 of the urea filler neck 2; a cover 140 mounted at an upper end portion of the cap body 101; an opener 160 configured to limit the opening action of the cover 140; and the membrane 130 configured to allow air to flow between the inside and the outside of the cap body 101.

The cap body 101 may include: a first body 110 detachably provided on the external side of the inlet 3; and a second body 120 mounted at an upper end portion of the first body 110 to be mounted on top of each other. The first body 110 may be formed in a cylindrical shape to surround the external circumferential surface of the inlet 3, and the second body 120 may be formed in a cylindrical shape having a diameter corresponding to the first body 110.

When the second body 120 is mounted at the upper end portion of the first body 110, a ventilation gap 123 having a predetermined height may be provided therebetween. The lower end portion of the second body 120 may be provided with a bonding portion 124 that protrudes downwardly from the second body 120 by a height corresponding to the predetermined height of the ventilation gap 123. The bonding portion 124 may be stacked and fixed to the upper end portion of the first body 110. The bonding portion 124 may be fixed to the upper end portion of the first body 110 by bonding, welding, or the like. The ventilation gap 123 may be formed as a ventilation space between the upper end portion of the first body 110 and the lower end portion of the second body 120. The ventilation gap 123 may be disposed between the bonding portions 124 disposed in a circumferential direction of the second body 120.

Between the first body 110 and the second body 120, a membrane 130 covering the ventilation gap 123 may be placed to pass only air (gas) through the ventilation gap 123. The membrane 130 may be formed in a thin annular band shape having a predetermined width in an arrangement direction (i.e., an up and down direction) of the first body 110 and the second body 120 and having a predetermined thickness in a radial direction of the first body 110 to be disposed in the circumferential direction of the first body 110. As the material of the membrane 130, a material that passes air and blocks foreign substances may be applied.

Herein, to support the membrane 130, an upper hole 112 may be formed at the upper end portion of the first body 110 and a lower hole 121 may be formed at the lower end portion of the second body 120. The upper portion of the membrane 130 may be hermetically inserted into and supported by the lower hole 121 of the second body 120, and the lower portion of the membrane 130 may be hermetically inserted into and supported by the upper hole 112 of the first body 110. The lower hole 121 may be formed only at the lower end portion of the second body 120 or at the lower end portions of both the bonding portion 124 and the second body 120.

The ventilation gap 123 is provided between the first body 110 and the second body 120, and the ventilation gap 123 is covered with the membrane 130, whereby even under the condition that the cap body 101 is sealed by the cover 140, ventilation is enabled between the inside and the outside of the cap body 101.

The cover 140 may be configured to always receive a force (i.e., an opening force) for opening the internal space (i.e., a second space portion) of the second body 120 by being disposed at the upper end portion of the second body 120. The second space portion 122, as a space surrounded by the second body 120, may be disposed above the internal space (i.e., a first space portion) of the first body 110. The inlet 3 of the urea filler neck 2 may be disposed in the first space portion 111 to be positioned below the second space portion 122.

The upper end portion of the second body 120 may be provided with a torsion spring 150 to supply the cover 140 with a force for opening the second space portion 122. The torsion spring 150 generates an elastic restoring force for opening the second space portion 122 while being compressed when the second space portion 122 is closed by operation of the cover 140. The elastic restoring force may turn the cover 140 in a direction of opening the second space portion 122 (i.e., in a first direction). When the second space portion 122 is closed, the cover 140 is turned in a direction of closing the second space portion 122 (i.e., in a second direction). The upper end portion of the second body 120 may be provided with a spring support 128 to support the torsion spring 150. The torsion spring 150 may be mounted inside the spring support 128 while being wound around the external surface of the rotation shaft 142. The rotation shaft 142 may be bonded to an edge portion of the cover 140.

The second body 120 may be provided with the opener 160 to control the opening and closing operation of the cover 140. The second body 120 may be formed in the external surface thereof with a sliding hole 125 through which the opener 160 is inserted, and the sliding hole 125 may be disposed in a radial direction of the second body 120. The sliding hole 125 may be provided with an elastic member 163 for elastically supporting one side (i.e., a first end) of the opener 160. As the first end portion 161a of the opener 160 is supported by the elastic member 163, the other side (i.e., a second end) of the opener 160 may protrude outside the sliding hole 125. The elastic member 163 may be provided between one side of the second body 120 disposed at the end portion of the sliding hole 125 and the first end portion 161a of the opener 160.

The opener 160 may include: a button portion 161 disposed in the sliding hole 125; and a locking portion 162 being provided on the external surface of the button portion 161 and protruding toward the lower surface of the cover 140.

The button portion 161 may be formed in a cylindrical structure having the first end portion 161a and the second end portion 161b, and may slide along the sliding hole 125 when pressed by an external force (a user's pressing force) to enter the interior of the sliding hole 125, compressing the elastic member 163.

The locking portion 162 may be formed in a hook shape having a stop protrusion and may be protrudingly provided on the external surface of the button portion 161. The locking portion 162 may be disposed at the upper portion of the second body 120 when the button portion 161 is disposed in the sliding hole 125. The upper portion of the second body 120 may be formed with a through-hole 126 to allow the locking portion 162 to slide. The through-hole 126 is disposed to communicate with the sliding hole 125.

Furthermore, the cover 140 is provided at the lower surface thereof with a hooking portion 141 with which the locking portion 162 is held by being engaged. The hooking portion 141 may protrude downwardly from the lower surface of the cover 140, and may be disposed in the through-hole 126 of the second body 120 when the cover 140 is in the closed state. The hooking portion 141 may be formed in a stop protrusion corresponding to the locking portion 162. When the cover 140 is stacked on the upper end portion of the second body 120 to close the second space portion 122, the hooking portion 141 may be engaged with the locking portion 162. In other words, when the cover 140 closes the second space portion 122, the hook portion 141 is caught and confined by the locking portion 162 so that the cover 140 is held while being disposed at the upper portion of the second body 120.

Figure 9:
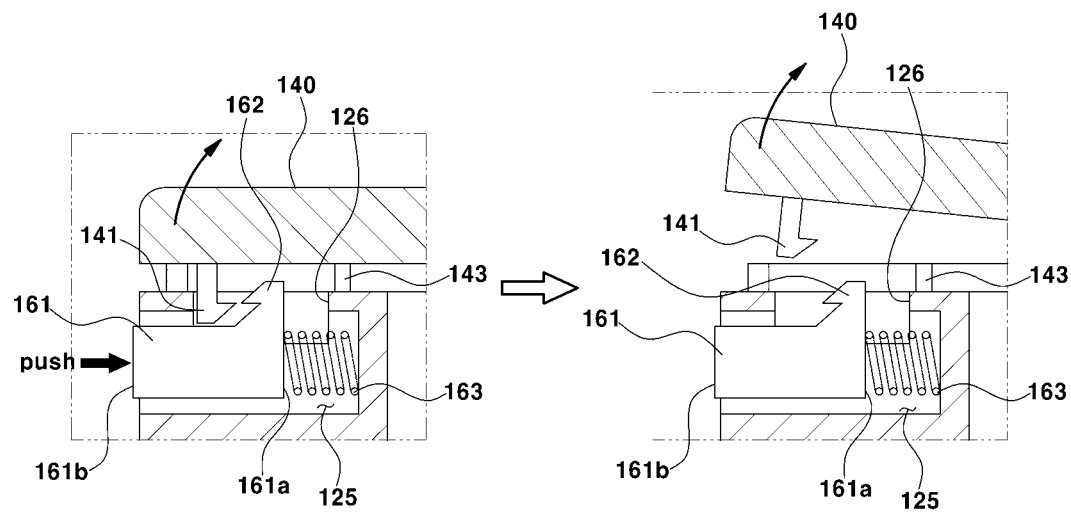
FIG. 9 is a view showing an operating state of an opener for opening the cover.
Figure 10:
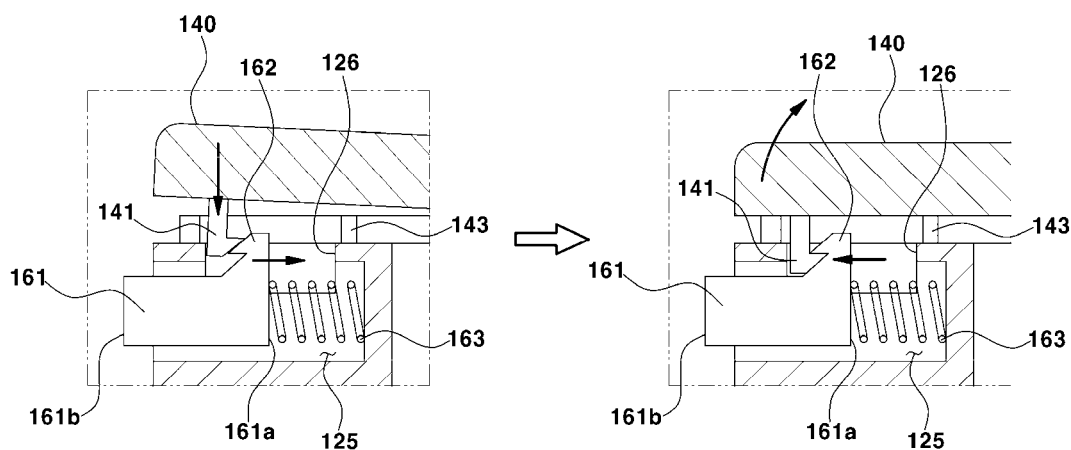
FIG. 10 is a view showing an operating state of the opener for closing the cover.

The hooking portion 141 may be provided with a lower inclined surface corresponding to an upper inclined surface of the locking portion 162. When the cover 140 closes the second space portion 122 by covering the same, the lower inclined surface of the hooking portion 141 is brought into contact with the upper inclined surface of the locking portion 162, and as the upper inclined surface of the locking portion 162 is pushed by the lower inclined surface of the hooking portion 141, the locking portion 162 slides along the through-hole 126. Accordingly, the locking portion 162 is returned to the original position thereof by a restoring force of the elastic member 163, whereby the hooking portion 141 may be caught by the locking portion 162 and held again (see FIG. 9 and FIG. 10). Thus, it is possible to prevent the cover 140 from turning in the direction of opening the second space portion 122 by the elastic restoring force of the torsion spring 150.

Accordingly, when a user presses the button portion 161, the locking portion 162 and the hooking portion 141 may be disengaged from each other while the button portion 161 is moved to the interior of the second body 120 along the sliding hole 125. As the locking portion 162 and the hooking portion 141 are disengaged from each other, the cover 140 is turned by the elastic restoring force of the torsion spring 150 to open the second space portion 122. In other words, when the button portion 161 slides in the direction of compressing the elastic member 163, the hooking portion 141 is released from the locking portion 162 and separated from the locking portion 162, and thus the second space portion 122 is open by the cover 140.

Furthermore, an elastic sheet 143 may be attached to the upper end portion of the second body 120. When the second space portion 122 is closed by operation of the cover 140, the upper surface of the elastic sheet 143 may be brought into close contact with the bottom surface (i.e., the lower surface) of the cover 140, and thus it is possible to prevent foreign substances from being introduced between the cover 140 and the second body 120. The elastic sheet 143 may be provided with an opening hole through which the spring support 128 and the locking portion 162 pass.

The elastic sheet 143 may be formed in an annular shape having a predetermined thickness using an elastic material, and may be disposed on the upper surface of the second body 120 along the circumferential direction of the second body 120.

Meanwhile, a body threaded portion 113 may be mounted to the internal surface of the first body 110. The body threaded portion 113 may be press-fitted into the first body 110 to be fixed thereto. The internal surface of the body threaded portion 113 may be provided with a threaded structure for engagement with the inlet 3. The external surface of the inlet 3 may be provided with a threaded structure corresponding to the threaded structure of the body threaded portion 113, thus forming an inlet threaded portion. The first body 110 may be detachably fastened to the external surface of the inlet 3 by the body threaded portion 113.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An opening device for a urea water inlet of a vehicle, the opening device comprising:
   a first body configured to be provided on an external side of an inlet of a urea filler neck;
   a second body disposed at an upper end portion of the first body with a ventilation gap between the first body and the second body, and provided with an internal space to be disposed above the inlet of the urea filler neck;
   a cover mounted at an upper end portion of the second body, and configured to receive a force to open the internal space of the second body;
   an opener provided in the second body, and configured to hold the cover at the upper end portion of the second body when the cover is configured to close the internal space, and to release holding of the cover when being pressed toward an inside of the second body; and
   a membrane mounted between the first body and the second body to pass air through the membrane while covering the ventilation gap,
   wherein a lower end portion of the second body is provided with a bonding portion fixed to the upper end portion of the first body, and the bonding portion is protrudingly formed from a lower end portion of the second body by a height corresponding to the ventilation gap.

2. The opening device of claim 1,
   wherein the opener includes a button portion, and a locking portion protruding from an external surface of the button portion toward a lower surface of the cover,
   wherein the second body is provided with a sliding hole through which the button portion is slidably mounted,
   wherein an elastic member elastically supporting a first end portion of the button portion is mounted in the sliding hole, and
   wherein a second end portion of the button portion is elastically biased outside the sliding hole by the elastic member.

3. The opening device of claim 2,
   wherein the cover is provided at the lower surface of the cover with a hooking portion protruding downwardly from the lower surface of the cover, and the hooking portion is engaged with the locking portion when the internal space of the second body is closed by operation of the cover.

4. The opening device of claim 3,
   wherein when the button portion is moved to slide in a direction of compressing the elastic member, the hooking portion engaged with the locking portion is released and separated from the locking portion.

5. The opening device of claim 1,
   wherein the membrane has a predetermined width and is mounted in a circumferential direction of the first body.

6. The opening device of claim 5,
   wherein an upper portion of the membrane is inserted into a lower hole of the second body, and a lower portion of the membrane is inserted into an upper hole of the first body.

7. The opening device of claim 1,
   wherein an elastic sheet is mounted at the upper end portion of the second body, and an upper surface of the elastic sheet is brought into contact with a lower surface of the cover when the internal space of the second body is closed by operation of the cover.

8. The opening device of claim 1,
   wherein an internal surface of the first body is provided with a body threaded portion, and the body threaded portion is configured to be detachably fastened to an inlet threaded portion provided on an external surface of the inlet of the urea filler neck.

9. The opening device of claim 1,
   wherein when the internal space of the second body is in a closed state by the cover, air passes in and out of the inlet of the urea filler neck through the membrane and the internal space of the second body.

10. The opening device of claim 1, wherein the cover is pivotally coupled to the upper end portion of the second body.

11. The opening device of claim 10, wherein the upper end portion of the second body is provided with a torsion spring to elastically bias the cover with a force for opening the internal space of the second body, and the torsion spring generates the force for opening the internal space by being compressed when the internal space is closed by operation of the cover.

* * * * *